United States Patent [19]

Sutherland et al.

[11] Patent Number: 5,699,074
[45] Date of Patent: Dec. 16, 1997

[54] ADDRESSING DEVICE AND METHOD FOR RAPID VIDEO RESPONSE IN A BISTABLE LIQUID CRYSTAL DISPLAY

[75] Inventors: Jeffrey W. Sutherland, Akron, Ohio; Timothy P. O'Hagan, Fort Myers, Fla.

[73] Assignee: Teletransaction, Inc., Akron, Ohio

[21] Appl. No.: 409,406

[22] Filed: Mar. 24, 1995

[51] Int. Cl.$^6$ ........................................................ G09G 3/00
[52] U.S. Cl. ................................ 345/90; 345/100; 345/94
[58] Field of Search ................................ 345/88, 100, 87, 345/94, 97, 90, 210; 359/101

[56] References Cited

U.S. PATENT DOCUMENTS

| | | | |
|---|---|---|---|
| 4,870,398 | 9/1989 | Bos | 345/210 |
| 4,901,066 | 2/1990 | Kobayashi et al. | 345/94 |
| 4,908,613 | 3/1990 | Green | 345/90 |
| 5,250,789 | 10/1993 | Johnsen | 235/383 |
| 5,251,048 | 10/1993 | Doane et al. | 345/88 |
| 5,296,953 | 3/1994 | Kambe et al. | 345/87 |
| 5,506,600 | 4/1996 | Ooki et al. | 345/100 |
| 5,570,216 | 10/1996 | Lu et al. | 359/101 |

OTHER PUBLICATIONS

Four page article published in *Proceedings of the Society For Information Display Digest of Technical Papers* entitled "Cholesteric Liquid Crystal/Polymer Gel Dispersion: Reflective Display Application" by D.K. Yang and J.W. Doane, published 1992.

Four page article from *Japan Display '92* entitled "Front–Lit Flat Panel Display from Polymer Stabilized Cholesteric Textures" by J.W. Doane, D.K. Yang and Z. Yaniv, published 1992.

*Primary Examiner*—Richard Hjerpe
*Assistant Examiner*—Ricardo Osorio
*Attorney, Agent, or Firm*—Benesch Friedlander, Copland & Aronoff LLP

[57] ABSTRACT

A front-lit, non-gray scale liquid crystal display device (10) including a polymer stabilized cholesteric liquid crystalline material has two optical states stable in the absence of an electric field. In a reflecting optical state incident illumination is directly reflected by the liquid crystal, producing a light pixel. In a scattering optical state incident illumination is absorbed by a black surface on the rear of the display, producing a dark pixel. A method employing a plurality of display control signals having the same polarity and differing phase relationships permits the fast video response of the display, notwithstanding that the average time to switch from a scattering optical state to a reflecting optical state is about 30 milliseconds, requiring about fifteen seconds to update a typical 480-row liquid crystal display using conventional array sequencing techniques. Several routines are presented for determining when to update such a display for a variety of applications.

37 Claims, 7 Drawing Sheets

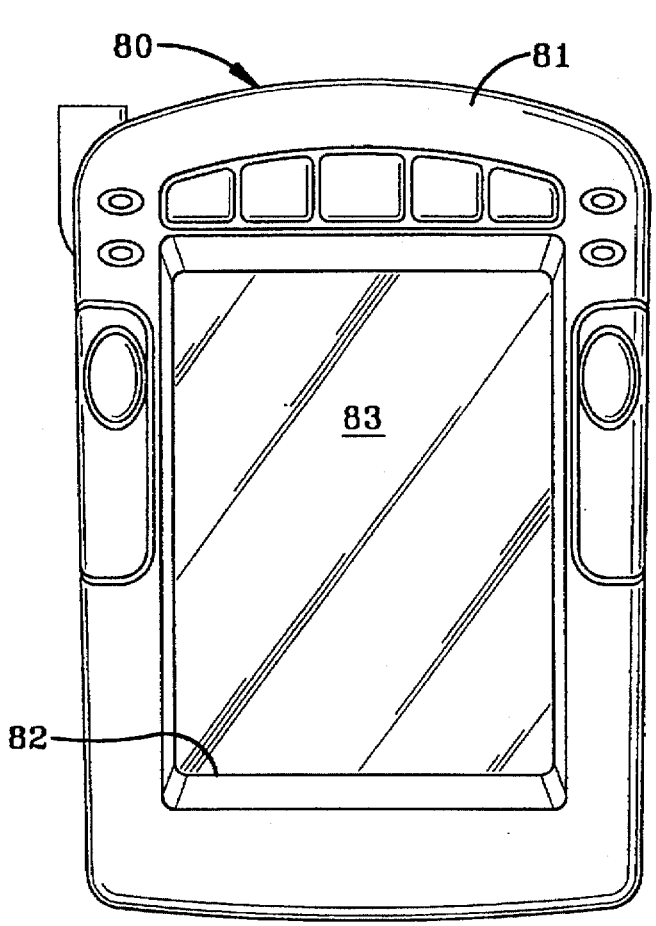
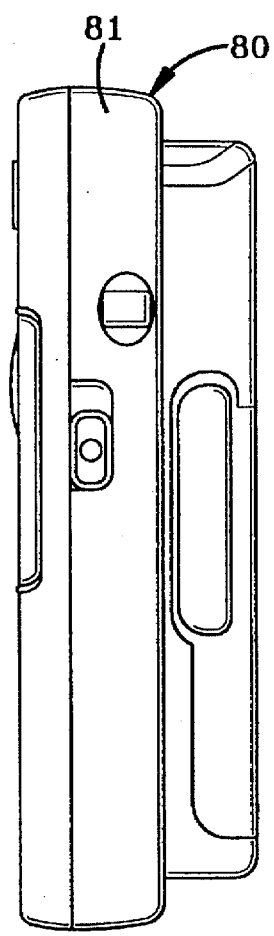
FIG-5  FIG-6
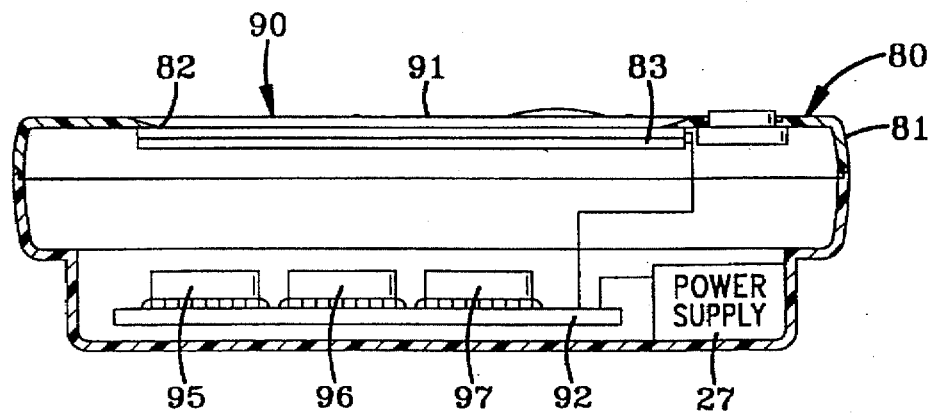
FIG-7

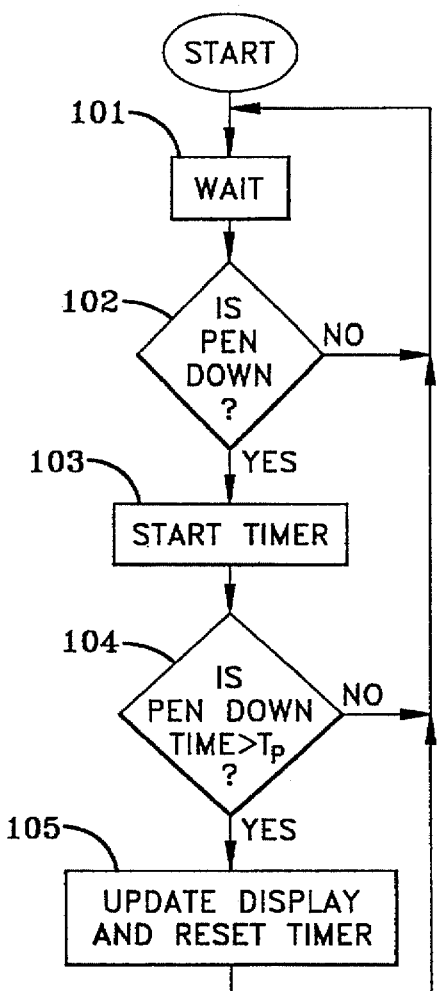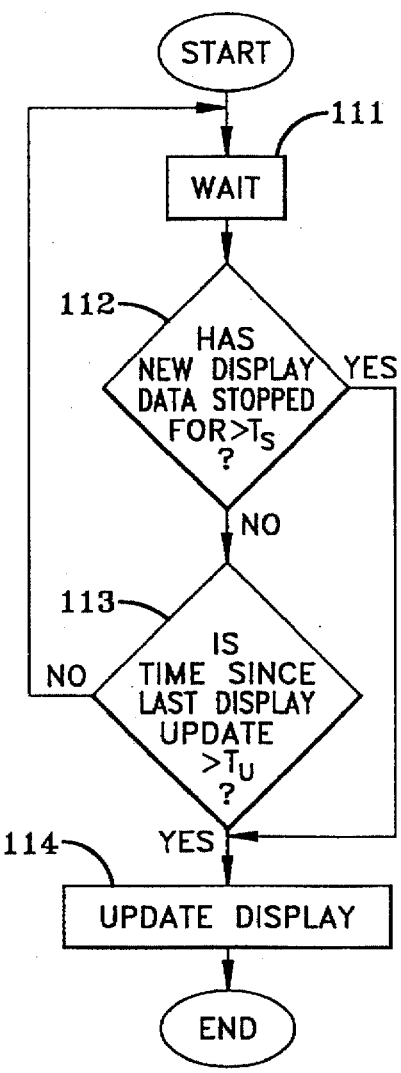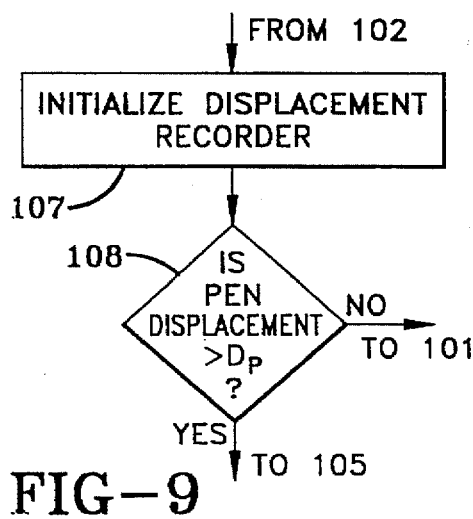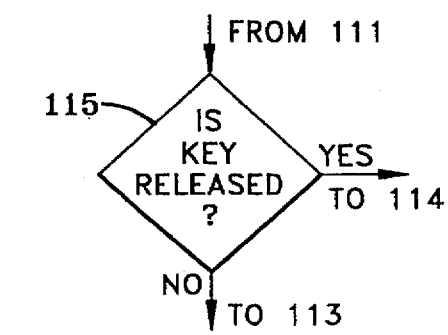
FIG-8
FIG-10
FIG-9
FIG-11

ADDRESSING DEVICE AND METHOD FOR RAPID VIDEO RESPONSE IN A BISTABLE LIQUID CRYSTAL DISPLAY

TECHNICAL FIELD

The present invention relates in general to portable digital computers with liquid crystal displays. More particularly, the present invention pertains to displays including stabilized liquid crystalline materials having two stable optical states in the absence of any electric field. More specifically, the present invention relates to a device and method for addressing and selecting rapidly the optical state of each pixel in a bistable state liquid crystal display.

BACKGROUND ART

Portable electronic devices nearly universally require a visual interface having the lowest possible power requirements. As a result, liquid crystal displays (LCDs) have become ubiquitous on a vast array of equipment including notably laptop, notebook and palmtop computers, personal electronic organizers, pen- and touch-input devices such as workslates and digital assistants, and other handheld portable data terminals. Unfortunately, while LCDs have historically required the least operating power of various display technologies, they still require significant amounts of power and also suffer from a lack of brightness and narrow viewing angle. A brief review of the basic aspects of LCDs will be helpful to better appreciate present day limitations.

LCDs are electrically controlled devices utilizing the optical properties of liquid crystal materials to display desired patterns with only or primarily ambient light. Commercial LCDs employ principally one of two basic mechanisms to control light passing therethrough. In "field-effect" cells the presence of an electric field, called the energized or active field state, changes the direction of the liquid crystal material's optic axis from its orientation in the absence of an electric field, called the unenergized, relaxed or inactive field state. In "scattering" cells the presence of an electric field results in either intense light scattering due to a disruption in the ordering of the unordered, unenergized molecular structure (called "dynamic scattering" or simply "scattering") or an intense light focusing due to an ordering of the unordered, unenergized molecular structure (called "quiescent scattering" or simply "reflecting").

Field-effect LCDs are formed with a layer of suitable liquid crystals sandwiched between two transparent polarizers, and the optical axis of the liquid crystals twists from one side of the display to the other. Transparent electrodes from which an electric field may be impressed across the liquid crystal are applied to the side of each polarizer engaging the liquid crystal layer, commonly in a two-dimensional array of rows and columns which intersect at individual picture elements called pixels.

The operation of such field-effect LCDs is dependent upon the phase relationship of the polarizers. If the two polarizers are oriented 90° out-of-phase (for example, one vertical and the other horizontal) and a reflector is applied to the outside surface of the polarizer opposite that from which light enters and the display is viewed, in the unenergized state light striking the display from the front side of the display is transmitted through both polarizers and the liquid crystal layer, and reflected back through both polarizers and the liquid crystal layer by the reflector. Thus, this front-lit field-effect LCD configuration is often referred to as a transreflective display. In the presence of a suitably energized field, the optical axis of the liquid crystal is altered resulting in light being blocked by the unaligned polarizer. Consequently, transreflective display pixels appear light in the inactive state and dark in the active state.

If the two polarizers are oriented in-phase (for example, both vertical or horizontal) and light enters the display from the side opposite (say, the rear) from the viewing side (say, the front), in the unenergized state light entering the display from the rear is blocked from passing through the other polarizer as a result of the twist in the optical axis of the liquid crystal. However, in the presence of a suitably energized field, the optical axis of the liquid crystal is altered resulting in light being transmitted through both polarizers and the liquid crystal layer. Thus, this rear-lit field-effect LCD configuration is often referred to as a transmissive display in which pixels appear dark in the inactive state and light in the active state.

Scattering LCDs are formed with a layer of suitable liquid crystals sandwiched between a transparent surface and a light absorbing (i.e., black) surface. As in field-effect LCDs, transparent electrodes from which an electric field may be impressed across the liquid crystal are applied to the side of each surface engaging the liquid crystal layer, in the common two-dimensional array of rows and columns which intersect at pixels.

In operation such scattering LEDs are illuminated and viewed from the same side, that of the transparent surface. As noted hereinbefore scattering LEDs either scatter or reflect incident illumination. If the optical condition of the liquid crystals allows illumination to pass therethrough, the viewer views the black surface making the pixel appear dark. If the optical condition of the liquid crystals reflects incident illumination, the pixel appears light (indeed, even bright because the reflected light need not pass through several attenuating layers). For this reason, this front-lit, scattering LCD configuration may be referred to as a reflective display.

Historically, several reasons have made transmissive LEDs the nearly universal choice among the various LCD technologies for display use in portable electronic devices. These reasons include offering the greatest contrast (i.e., are the brightest), having a wider viewing angle, an acceptably fast video response, and requiring less power. However, molecules of liquid crystal used in transmissive LEDs return to their relaxed state very shortly after the electric field is discontinued; in other words, these liquid crystal materials have only one unenergized, stable state. Consequently, it is necessary to continuously apply a voltage difference across each pixel that is to become or remain excited and appear dark. This requirement of continued excitation slows video response and can increase power consumption significantly.

Recently a new class of liquid crystals have been recognized which when disbursed with a polymeric stabilizer produce two unenergized, stable states, a focal conic (scattering) state where it passes light and appears transparent, and a planar (reflecting) state, where it does not pass light, but reflects light within a limited wavelength range. A bistable liquid crystal would not require constant refreshing and could save appreciable amounts of energy. Indeed, in *Cholesteric Liquid Crystal/Polymer Gel Dispersion: Reflective Display Application* by D. K. Yang and J. W. Doane, SID Digest of Technical Papers, pp. 759–762, (May 1992), its authors conclude that such compositions hold promise for front-lit liquid crystal displays, but "[v]ideo rates are not yet achievable with line-at-a-time addressing, however, because the transition from the focal conic to the planar texture is too slow." (*Id,* p. 762.)

In *Front-Lit Flat Panel Display from Polymer Stabilized Cholesteric Textures* by J. W. Donne, D. K. Yang, and A Yaniv, Japan Display '92, pp. 73–76 (1992), two line-at-a-time addressing schemes for bistable LCDs are proposed and tested, one for gray scale displays and another for displays without gray scale. In the case of displays with gray scale, a voltage pulse was applied across every pixel in the display to switch the entire display into the reflecting state. Thereafter voltage pulses of mixed polarity are applied to each display row one-at-a-time allowing for all necessary pixels to be switched to the desired gray scale. In the case of displays without gray scale, the display is intentionally not switched into the reflecting state; rather, each row is selected one-at-a-time and column and row voltages of opposite polarities chosen to switch all pixels in the selected row to the desired scattering or reflecting state. Of course, as the authors recognize, since about 0.03 second is required for the transition from the scattering state to the reflecting state, and a display typically includes 480 or more rows, updating a display once would require nearly fifteen seconds, a wholly unacceptable video response time. Moreover, changing all display pixels at once results in visible screen flash that many users find unacceptably annoying.

SUMMARY OF THE INVENTION

It is, therefore, an object of the present invention to provide a non-gray scale, bright LCD that does not require power to maintain display pixels in either a light or dark state.

It is another object of the present invention to provide a LCD, as set forth above, which has an acceptably fast video response time.

It is still another object of the present invention to provide a LCD, as set forth above, that substantially eliminates or minimizes screen flash.

These and other objects and advantages of the present invention over existing prior art forms will become more apparent and fully understood from the following description in conjunction with the accompanying drawings.

In general, in accordance with the present invention a method for addressing in an array of rows and columns and selecting rapidly the optical state of each pixel in a liquid crystal display including a liquid crystal having a first optical state and a second optical state both stable in the absence of an electric field includes identifying all rows that include pixels whose optical state is to be changed, changing to the first optical state a first plurality of pixels in a plurality of rows, the first plurality of pixels being less than all pixels in the plurality of rows, and changing to the second optical state selected of the first plurality of pixels.

In accordance with the present invention a liquid crystal display includes a liquid crystal having a first optical state and a second optical state both stable in the absence of an electric field, and a circuit for addressing in an array of rows and columns and selecting rapidly the optical state of each pixel in the liquid crystal display, the circuit generating a plurality of control signals including a first control signal having a first phase differing from that of all other of the plurality of control signals and a first polarity the same as that of all other of the plurality of control signals.

In accordance with the present invention a device has a reflective liquid crystal display including a liquid crystal having a first optical state and a second optical state both stable in the absence of an electric field, a processor generating a plurality of data signals for display of data upon the liquid crystal display, the liquid crystal display receiving the data signals and displaying the data, and a substantially transparent data input mechanism in operative association with the liquid crystal display, the data input mechanism generating at least one input signal, the processor receiving the input signal and selecting the data to be displayed.

BRIEF DESCRIPTION OF THE DRAWINGS

FIG. 5 is a top plan view of an exemplary portable workslate having a liquid crystal user interactive display in accordance with the present invention.

FIG. 6 is a side view of the exemplary portable workslate depicted in FIG. 5.

FIG. 7 is a cross-sectional elevation through an exemplary device embodying a liquid crystal user interactive display, similar to, but not identical as the exemplary portable workslate shown in FIGS. 5 and 6.

FIG. 8 is a top level flow chart of an exemplary routine for determining when the liquid crystal display of the workslate shown in FIG. 5 should be updated, and is based upon the time a stylus is in engagement with the workslate.

FIG. 9 is a top level flow chart of another exemplary routine for determining when the liquid crystal display of the workslate shown in FIG. 5 should be updated, and is based upon the displacement of a stylus in engagement with the workslate.

FIG. 10 is a top level flow chart of another exemplary routine for determining when the liquid crystal display of the workslate shown in FIG. 5 should be updated, and is based upon receipt of new display data and the lapsed time since the last display update.

FIG. 11 is a top level flow chart of another exemplary routine for determining when a liquid crystal display in accordance with the present invention should be updated, and is based upon the release of a key actuation and the lapsed time since the last display update.

PREFERRED EMBODIMENT FOR CARRYING OUT THE INVENTION

Figure 1:
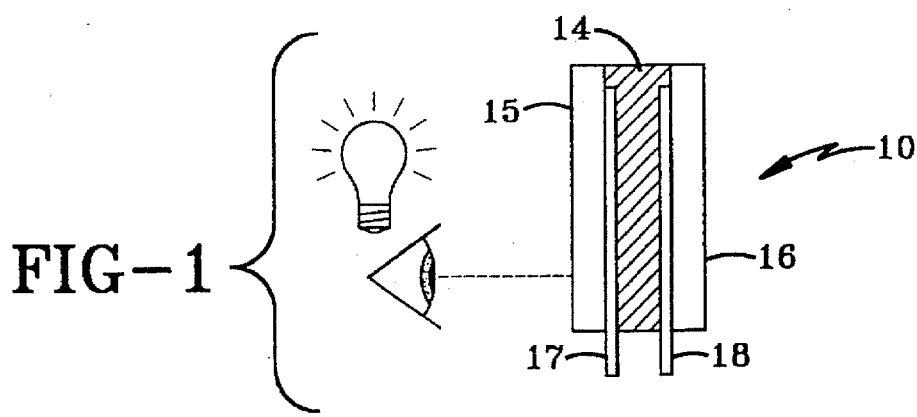
FIG. 1 is an elevational view through an exemplary scattering type, bistable liquid crystal display in accordance with the present invention.

FIG. 1 presents an elevational view through an exemplary scattering type, liquid crystal display (LED), generally indicated by the numeral 10, suitable for use in conjunction with the present invention. FIG. 1 includes a layer of suitable liquid crystals 14 having at least two stable optical states in the absence of an electric field, sandwiched between a transparent surface 15 and a light absorbing (i.e., black) surface 16. Transparent electrodes 17,18 from which an electric field may be impressed across liquid crystal 14 are applied to the side of each surface 15, 16 engaging the liquid crystal layer 14 in a suitable geometry to individually address each display pixel as noted hereinafter.

Figure 2:
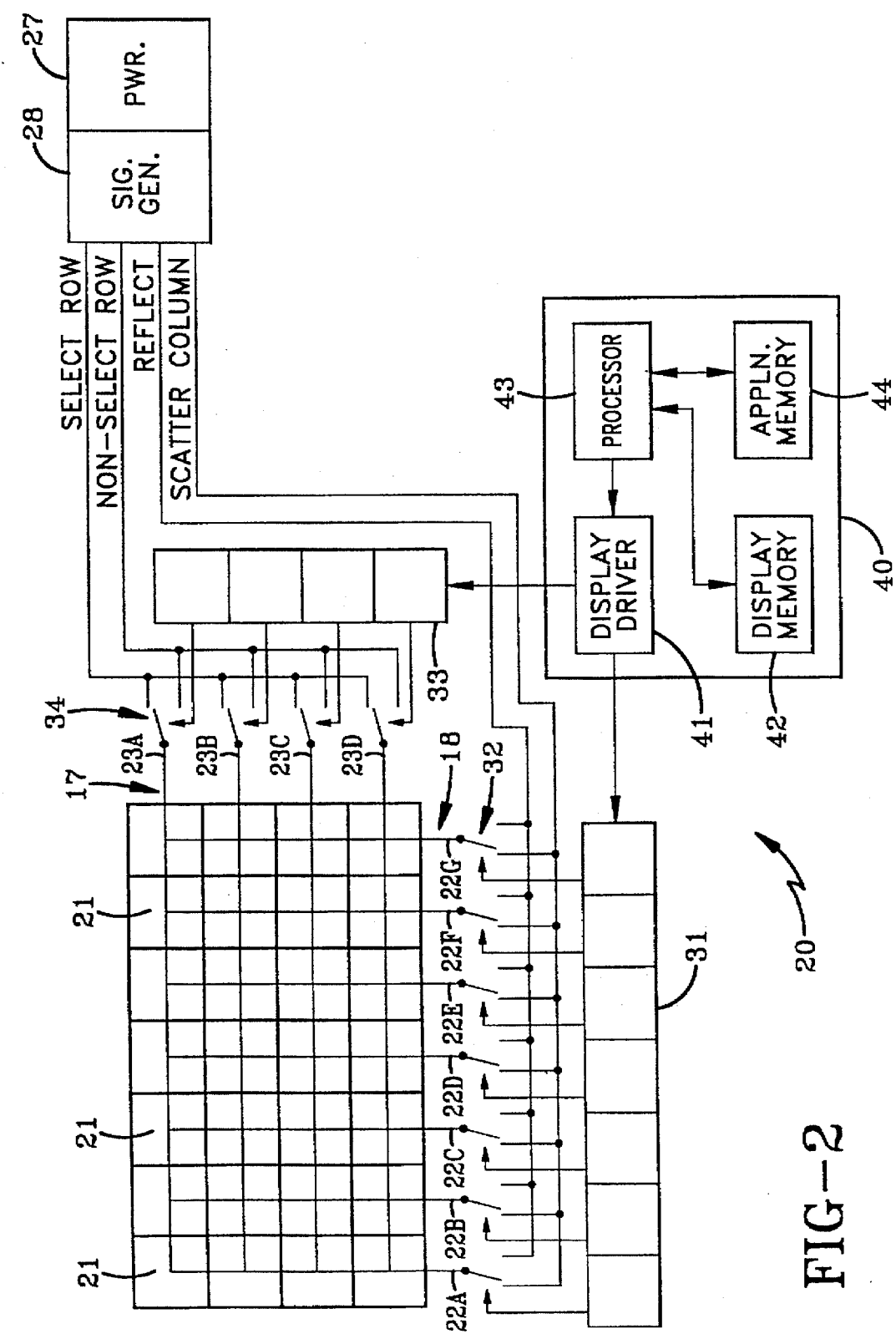
FIG. 2 is a partial schematic, partial block diagram of an exemplary addressing circuit for the pixel array in the scattering type, bistable liquid crystal display shown in FIG. 1.

FIG. 2 illustrates, in partial schematic and partial block diagram form, an exemplary circuit in accordance with the present invention, generally indicated by the numeral 20, for addressing individual pixels 21 and controlling their optical state. FIG. 2, merely for purposes of explanation, presents a matrix of seven columns and four rows of pixels 21, and a like plurality of column conductors 22A through 22G and row conductors 23A through 23D. Circuit 20 further includes power supply 27 such as a battery or other portable or fixed direct current or alternating current source, switching signal generator 28, column shift registers 31, column relay switches 32, row shift registers 33, row relay switches 34, and a processor unit 40. Processor unit 40 may include display driver circuit 41, display memory 42, processor 43 and application memory 44.

Figure 3:
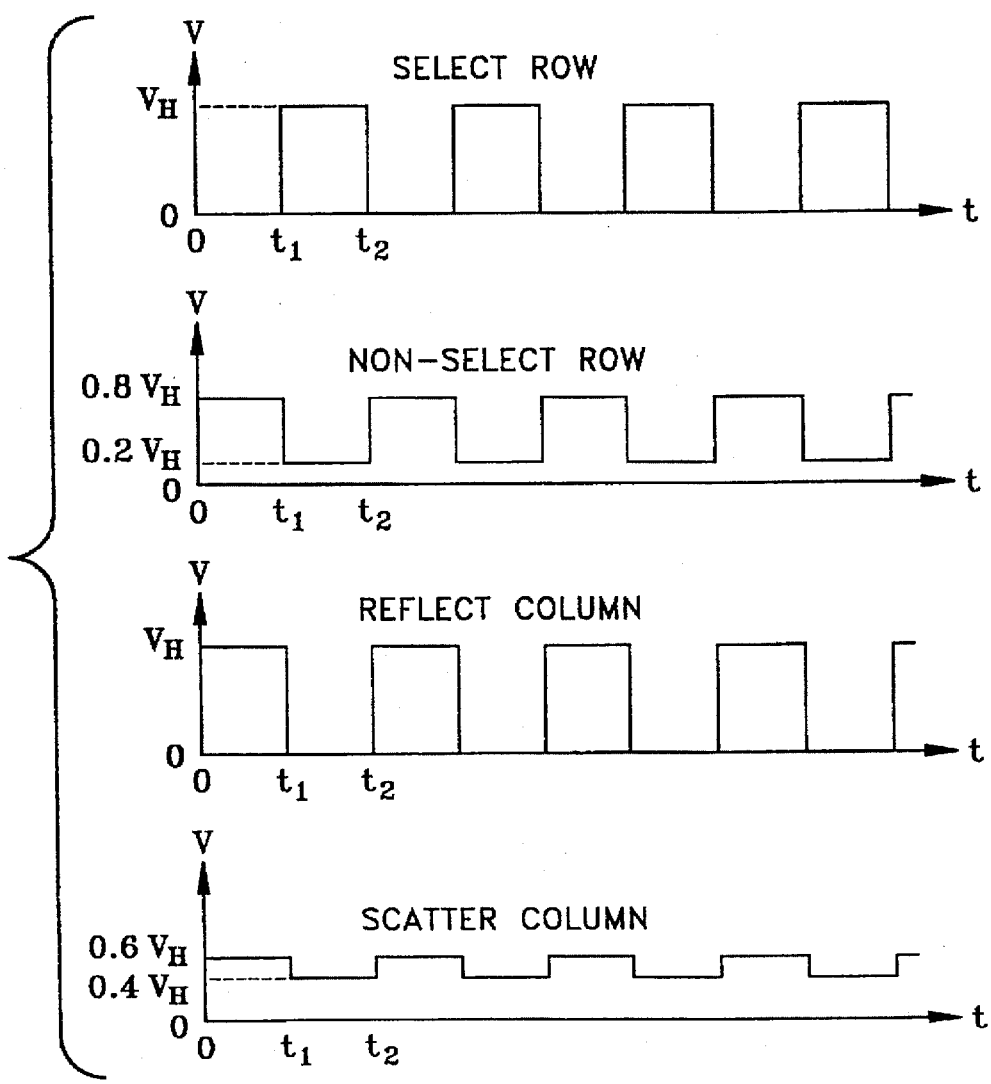
FIG. 3 presents a plurality of exemplary voltage waveforms generating by the addressing circuitry shown in FIG. 2 to selectively switch the optical state of each desired pixel in the scattering type, bistable liquid crystal display shown in FIG. 1. The waveforms are not necessarily to scale or in time relation to each other.

Switching signal generator 28 generates four square-wave pixel control signals 50 for selectively addressing and controlling the optical state of each pixel 21: a select row signal 51, a non-select row signal 52, a reflect column signal 53 and a scatter column signal 54. As seen in FIG. 3, these four signals 50 have maximum voltages and minimum voltages that are all of the same polarity and vary between $V_H$ and zero volts where $V_H$ is a predetermined voltage magnitude adequate to change a pixel 21 from a scattering optical state to a reflecting optical state, 0.6 $V_H$ changes a pixel from a reflecting optical state to a scattering optical state, and 0.2 $V_H$ does not alter the existing optical state of any pixel 21 across which such a voltage magnitude is applied. Also, the select row signal 51 is 180° out-of-phase with the other three pixel control signals, each of which is in-phase (or in-sequence) with each other. In other words, whenever the select row signal 51 is at its voltage minimum shown in FIG. 3 of zero volts (such as between time zero and $t_1$), the non-select row signal 52 is at its maximum of 0.8 $V_H$ volts, the reflect column signal 53 is at its maximum of $V_H$ volts, and the scatter column signal 54 is at its maximum of 0.6 $V_H$ volts. Conversely, whenever the select row signal 51 is at its voltage maximum shown in FIG. 3 of $V_H$ volts (such as between time $t_1$ and $t_2$), the non-select row signal 52, the reflect column signal 53 and the scatter column signal 54 are at their respective minimum voltage magnitudes of 0.2 $V_H$, zero, and 0.4 $V_H$ volts.

Operation of circuit 20 is straightforward. As processor 43 executes instructions from its operating system and/or applications stored in application memory 44, the information desired to be presented by LCD 10 is stored in display memory 42, as is well known to the ordinarily skilled artisan. Display driver 41, in a manner also well known to the ordinarily skilled artisan, is responsive to the stored display information, and generates appropriate row and column data signals which are serially transmitted to column shift registers 31 and row shift registers 33.

In general, when display driver 41 has determined one or more pixels in one or more rows must be changed from either reflecting optical state to a scattering optical state, or vice versa, data signals generated by display driver 41 gate a select row signal 51 to all rows including pixels to be changed, and gate a non-select row signal 52 to all other rows. Simultaneously, a reflect column signal 53 is gated to each column conductor corresponding to a pixel that is to be in a reflecting optical state signal, and a scatter column signal 54 is gated to each column conductor corresponding to a pixel that is to be in a scattering optical state. One of ordinary skill will appreciate from the waveforms of FIG. 3 that this interaction of control signals 50 will result in an instantaneous voltage magnitude of $V_H$ across pixels receiving both a select row signal 51 and a reflect column signal 53, 0.6 $V_H$ across pixels receiving both a select row signal 51 and a scatter column signal 54, and 0.2 $V_H$ across pixels receiving both a non-select row signal 52 and either a reflect column signal 53 or a scatter column signal 54, changing or maintaining the optical state of each pixel as desired.

The specific sequence by which control signals 50 are applied to pixels 21 in the bistable LCD are of importance to the present invention in controlling and minimizing display update times. The specific sequence attempts to minimize the number of times pixels must be changed from a scattering optical state to a reflecting optical state, which takes an average of 30 milliseconds for the exemplary bistable liquid crystal described hereinbefore, and instead allow a greater number of times pixels must be changed from a reflecting optical state to a scattering optical state, which takes an average of 0.5 milliseconds. The specific sequence also attempts to minimize power usage by minimizing the total number of times pixels must be changed.

Figure 4A:
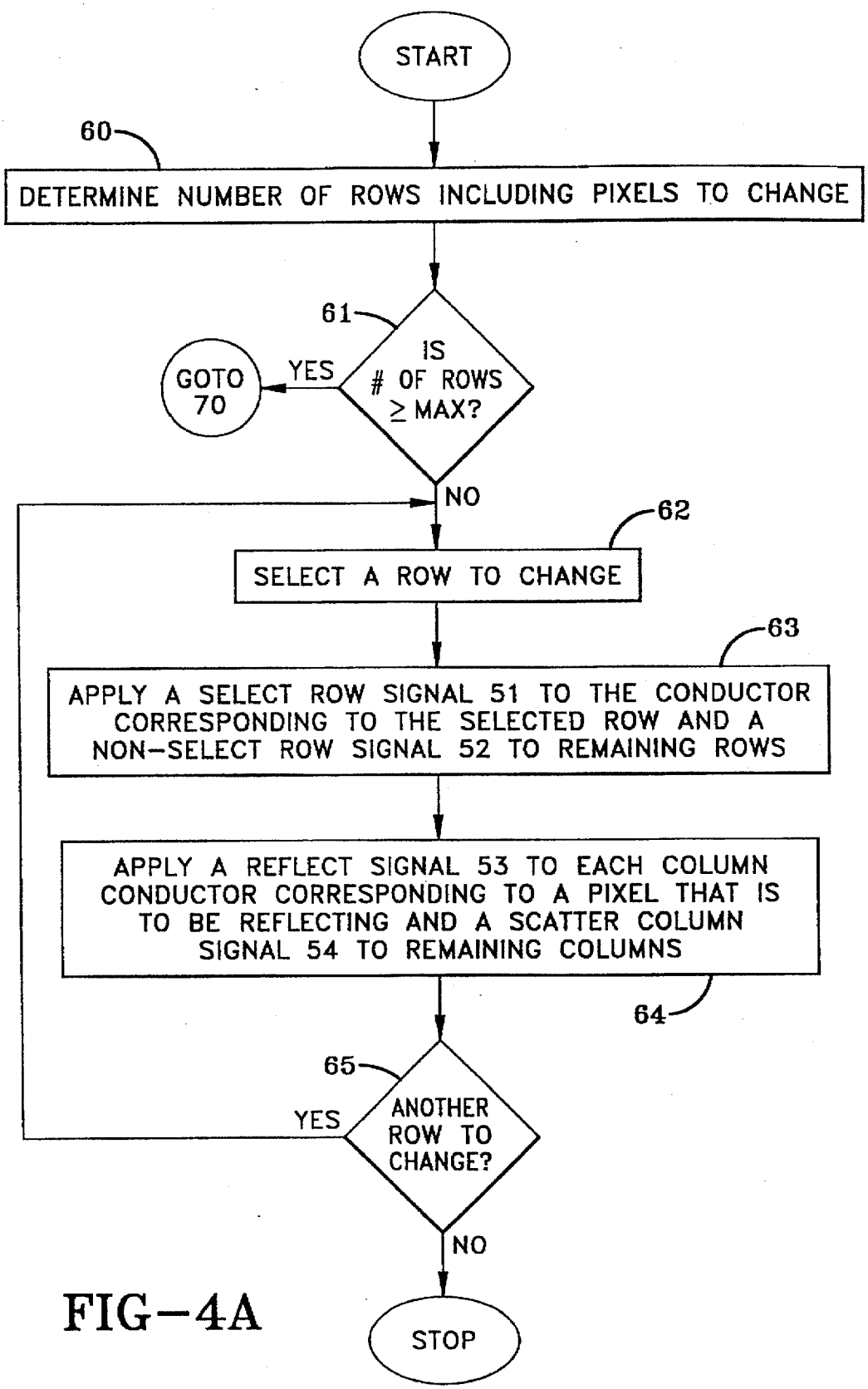
FIGS. 4A and 4B are a top level flow chart of an exemplary computer program for addressing in accordance with the present invention, the scattering type, bistable liquid crystal display shown in FIG. 1.
Figure 4B:
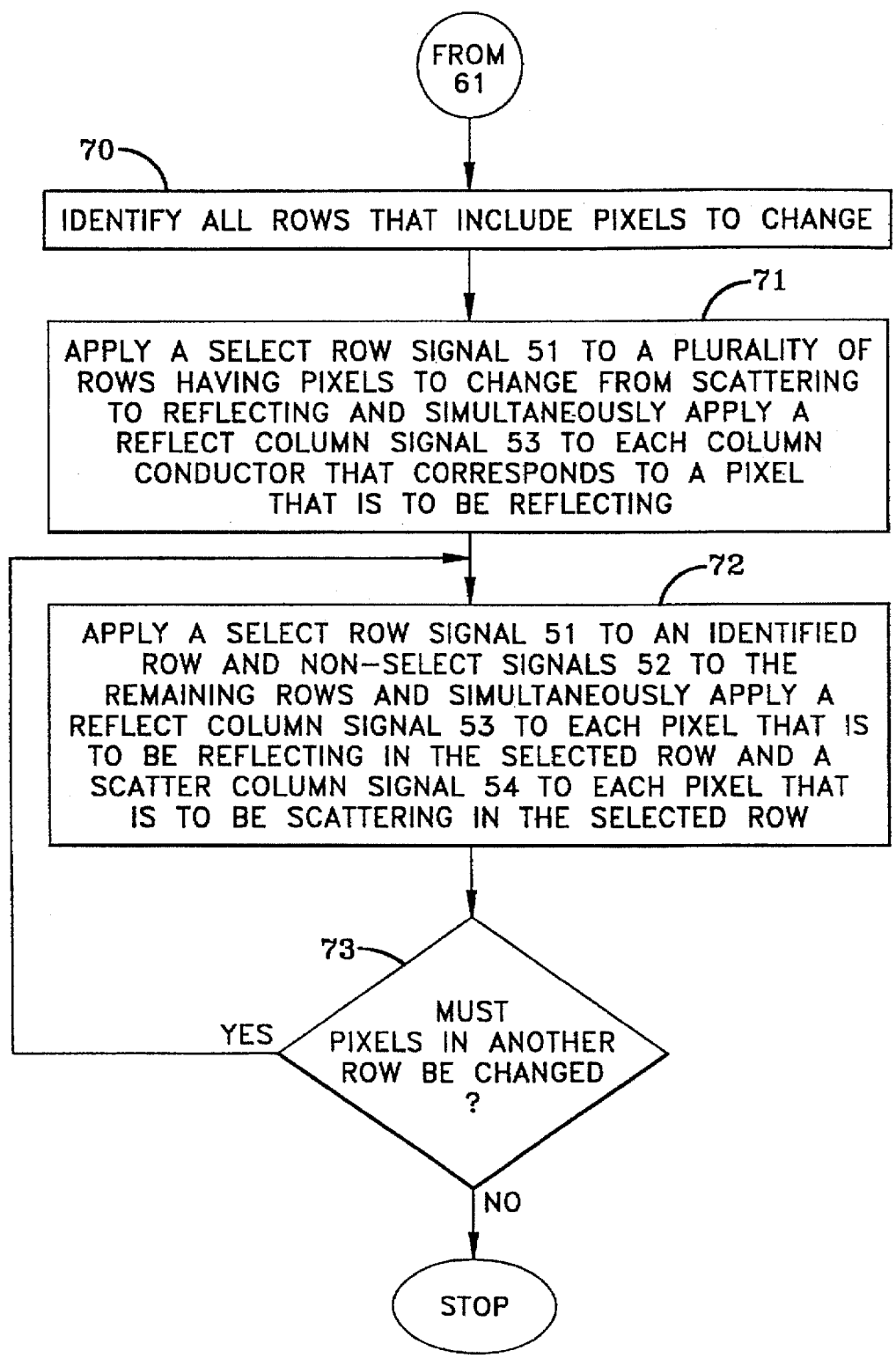

FIGS. 4A and 4B present a top level flow chart of an exemplary method, which may be embodied in the computer program executed by processor 43 and display driver 41, for addressing and updating the pixels in a scattering type, bistable LCD. Starting at step 60, the number of rows with pixels 21 to be changed from scattering to reflecting or vice versa is determined. This number is compared to a preselected maximum in step 61, and if less or equal to that number, circuit 20 proceeds in step 62 to choose each row having such changes one row-at-a-time, applying in step 63 the requisite reflect column signal 53 or scatter column signal 54 to each pixel in the selected row as appropriate and effecting the required optical state change or maintenance. This processes is repeated until the test conducted in step 65 determines there are no remaining rows with changes to be made. If fifteen rows were changed, it would require nearly one-half second (b 30milliseconds per line), most likely the outer limit of tolerable display update time.

If the number of rows including pixels 21 to be changed exceeds the maximum acceptable number, then a different approach is employed to effect the necessary optical state changes in the minimum time. This approach involves simultaneously changing a plurality of pixels 21 in a plurality of rows, but less than all pixels 21, to a reflecting optical state, and then changing selected of those pixels 21 back to a scattering optical state. First, all rows that include pixels 21 that are to be changed to are identified and selected in step 70. Next, in step 71 select row signal 52 is applied simultaneously to all rows having pixels 21 that are to be changed from a scattering optical state to a reflecting optical state. Simultaneously reflect column signal 53 is applied to each column conductor 22 that corresponds to a pixel 21 that is to be in the reflecting optical state. Thereafter, in step 72 a select row signal 52 is applied to a single row selected from the group of rows identified as including one or more pixels 21 requiring optical state change, and a non-select row signal 53 is applied to the conductors corresponding to all remaining rows in LCD 10. Simultaneously reflect column signal 53 is applied to each column conductor 22 that corresponds to a pixel 21 in the selected row that is to be in a reflecting optical state and a scatter column signal 54 is applied to each column conductor 22 that corresponds to a pixel 21 in the selected row that is to be in a scattering optical state. Step 73 tests whether there remains pixels 21 in another row that require changing from one optical state to another, and, if so, repeats step 72, and, if not, stops.

It should now be apparent that the present invention avoids the difficulties discussed hereinbefore by controlling the specific sequence by which control signals 50 are applied to the LCD pixels 21 and the voltage polarity and magnitude of the control signals 50.

FIGS. 5 and 6 present a top plan and side view of an exemplary portable workslate 80 suitable for use with liquid crystal display 10 and addressing circuit 20. Workslate 80 includes a housing 81 shaped to be readily and comfortably carried in the palm of an operator's hand, and operated while so carried. Housing 81 has an aperture 82 through which a display 83 may be viewed and operated interactively by the operator.

FIG. 7 depicts a cross-sectional elevation through an exemplary device 90 which solely for purposes of simplification is shown as similar, but not identical, to the exemplary portable workslate 80 shown in FIGS. 5 and 6. Device 90 includes a housing 81, aperture 82 and liquid crystal display 83. A pen-, touch- or other data input mechanism 91, such as a well-known capacitive or resistive contact panel which generates a signal indicative of the display location engaged by the pen or finger, is sandwiched between housing 81 and display 83. The various components of circuit 20 discussed hereinbefore may be distributed as desired within housing 81 on a printed circuit board 92 carrying a plurality of electrical components pictured diagrammatically as 95, 96 and 97, and power supply 27 which may include nickel cadmium or lithium ion rechargeable batteries cells popular in portable electronic devices.

Because liquid crystal display 83 has two stable optical states and therefore does not require continually refreshing, each exemplary workslate 80 and any other device embodying liquid crystal display 83 must determine when display 83 is to updated and effect that update. The preferred manner in which this determination is made and effected is a function of the nature of the application(s) for which the device is utilized; several possible methods are disclosed in FIGS. 8 through 11.

The methods explained herein and illustrated in the drawings by which a determination is made that an update of liquid crystal display 83 is then necessary or desirable all involve circuit 20 being signaled about an external event primarily determinative of update initiation. Where workslate 80 is used for writing or drawing by the operator, methods as that shown in the flow charts of FIGS. 8 and 9 may be most appropriate. In these applications a stylus such as a pen or finger engages and is displaced across data input mechanism 91, whereupon liquid crystal display 83 must be updated to show a line at the pixels over which the stylus has been displaced. In these instances the update determination is made by processor 43 based on either the time a pen or finger has engaged data input mechanism 91, or the distance traveled by the pen or finger, respectively.

More particularly, the display update routine depicted in FIG. 8 may be started upon initialization of processor 43 and continued throughout operation of workslate 80, first waiting in block 101 for a period of time suitable for the application being performed. This waiting period may be fixed or variable, and may be shorter in duration for an application requiring more frequent display updates, and longer in duration for an application where frequent updates are not critical to overall performance and there is a desire to conserve power. Next a decision is made whether the pen or other stylus is then engaging data input mechanism 91, as seen in block 102, and, if not, the wait and subsequent process are repeated. If so a timer is begun in block 103 to track the elapsed time the pen has engaged data input mechanism 91, and the elapsed time compared with a preselected elapsed time $T_p$ in step 104. If the preselected elapsed time $T_p$ is not exceeded, which of course it likely will not be at the outset, a software flag may be set to insure the elapsed timer is not restarter, and the wait and subsequent process repeated. Once the preselected elapsed time $T_p$ is exceeded, then in block 105 liquid crystal display 83 is updated as explained hereinbefore, and the timer reset to zero.

FIG. 9 presents an alternative display update routine that is nearly identical to that depicted in FIG. 8 except for steps 103 and 104. In this instance updates are based upon the displacement of the pen or other stylus, determinable from actual distance traversed or the quantity of rows or columns crossed. Consequently, instead of starting an elapsed time timer as in block 103, here a displacement recorder is initialized to zero in block 107. Thereafter, in block 108, the pen displacement stored in the displacement recorder is compared to a preselected displacement $D_p$; if exceeded, a software flag may be set to insure the displacement recorder is not reset, and the wait and subsequent process repeated. Once the preselected displacement $D_p$ is exceeded, liquid crystal display 83 is updated and the displacement recorder is reset as in block 105.

Where workslate 80 is executing an application under a graphical user interface (GUI) such as Windows (commercially available from Microsoft Corporation of Redmond Wash.), whether a display update is necessary or desirable may be determined as shown in the flow chart of FIG. 10. In GUI applications a stylus such as a pen or finger engages data input mechanism 91 at fixed locations where graphic buttons are pictured on the display, but is not displaced across data input mechanism 91, whereupon liquid crystal display 83 must be updated in accordance with the application and operator selection. In this instance the update determination is made by processor 43 based on a combination of receipt by display driver 41 of all the new data for liquid crystal display 83 and the elapsed time since the last update of liquid crystal display 83.

More particularly, the display update routine depicted in FIG. 10 may be started when processor 43 is signaled the operator has actuated a GUI button and wait in block 111 for a period of time suitable for the application being performed until display driver 41 signals processor 43 that a display update is necessary or desirable. Next, as seen in block 112, a decision is made whether the new data being received for liquid crystal display 83 had stopped for a minimum time $T_s$ (indicative that the new data is entirely received and ready for display), and, if not, the elapsed time since the last display update is compared to a preselected elapsed time interval $T_u$ in step 113. If the preselected elapsed time interval $T_u$ has been exceeded, the display is promptly updated in block 114. Of course, once all the new data for a display update has been received, the display is updated irrespective of the elapsed time since the last display update. Elapsed time since the last display update may be tracked using any of the well-known methods, such as by display driver 41 or processor 43.

Figure 12:
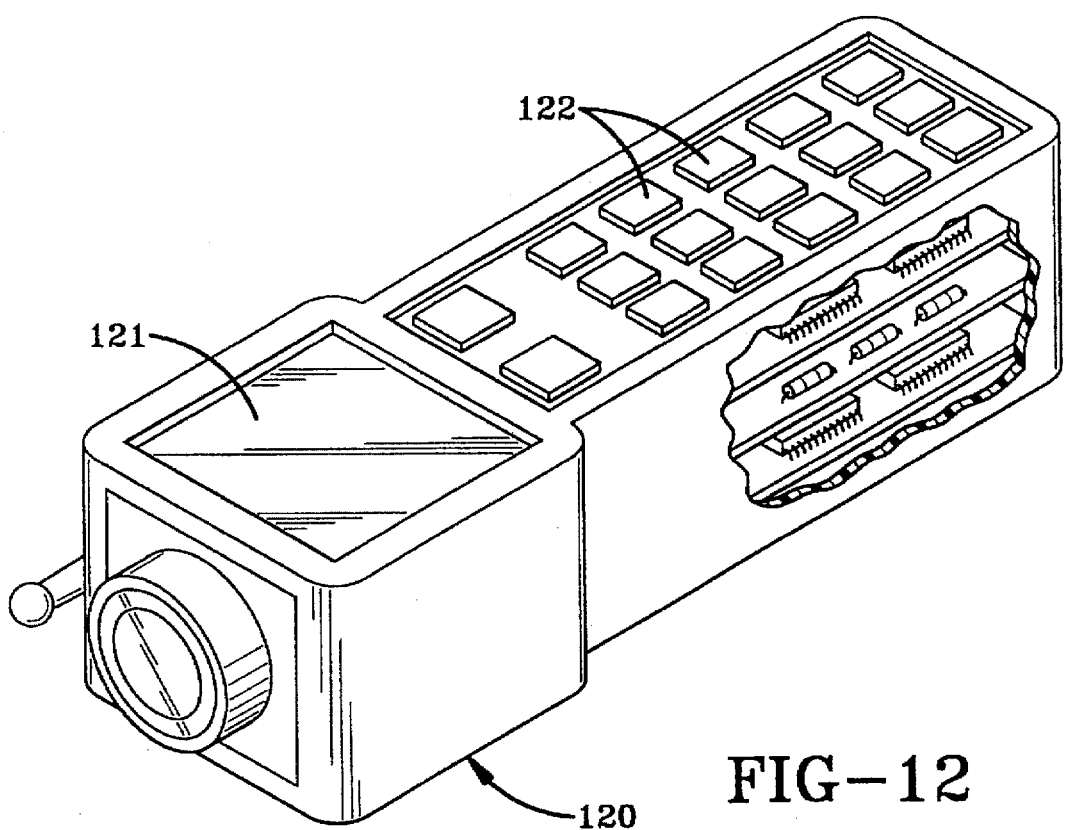
FIG. 12 is a perspective view of a portably operable, handheld data terminal including a graphical or text-based liquid crystal display and a keypad for data input thereto for which the routine shown in FIG. 11 is likely most suited.

FIG. 11 presents an alternative display update routine that is nearly identical to that depicted in FIG. 10 except for step 112. This routine may be best suited for applications in which a keypad is employed for data input, such as the portably operable, handheld data terminal 120 shown in FIG. 12 to include a graphical or text-based liquid crystal display 121 and a keypad 122 for data input. Because it is generally desired to update liquid crystal display 121 each time a depressed key is released, step 115 determining whether a key has just been released is substituted for step 112 in FIG. 10. If any key, such as the scroll key, is held depressed and not released, liquid crystal display 121 will still be updated periodically in block 113 after the preselected elapsed time $T_u$ is exceeded. In this manner liquid crystal display 121 is updated each time a key is released and periodically when a key is maintained in its actuation orientation.

Modifications within the spirit of the present invention now should be evident to the skilled artisan. For example, any liquid crystalline material stabilized to possess at least two optical states stable in the absence of an impressed field may be employed in accordance with the present invention. Thus, in addition to chemically stabilized liquid crystals, liquid crystals may be stabilized for use with the present invention with any of the various surface treatments known to produce stabilization mechanically. Also, while the embodiment described herein employs rows to provide a first order selection, the roles of columns and rows may be reversed. It will be further understood that the maximum number of rows elected in step 61 is a matter of design choice as a compromise with fast video response time. And, the various routines for determining when to update a liquid crystal display in accordance with the present invention described hereinbefore may be combined among themselves and with others to provide the optimal balance of power savings and performance for the specific application of interest.

Inasmuch as the present invention is subject to variations, modifications and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of low power consumption liquid crystal displays.

We claim:

1. A method for modifying a liquid crystal display comprised of an array of pixels arranged in a plurality of rows and a plurality of columns, said pixels have a first optical state and a second optical state, both optical states stable in the absence of an electric field, wherein control signals are applied to the array of pixels to modify the optical state thereof, said method comprising:
   simultaneously applying selective control signals to the plurality of rows having pixels requiting a change to the first optical state; and
   sequentially applying selective control signals to one or more rows of pixels having at least one pixel requiring a change in optical state.

2. A method according to claim 1, wherein said first optical state is reflecting and said second optical state is scattering.

3. A method according to claim 1, wherein said array of pixels includes a plurality of row conductors respectively associated with rows of pixels, and a plurality of column conductors respectively associated with columns of pixels, said plurality of row and column conductors selectively applying a voltage across each pixel.

4. A method according to claim 3, wherein said step of simultaneously applying selective control signals includes the steps of:
   applying a select row signal to every row conductor associated with a row having at least one pixel requiring a change from a scattering optical state to a reflecting optical state; and
   applying a reflect signal to each column conductor associated with a pixel that is to be in a reflecting optical state.

5. A method according to claim 3, wherein step of sequentially applying selective control signals includes the steps of:
   applying a select row signal to the row conductor associated with a select row having at least one pixel requiring a change in optical state;
   applying a non-select row signal to the row conductors associated with the remaining rows;
   applying a reflect signal to each column conductor associated with a pixel in said select row that is to be in the reflecting optical state; and
   applying a scatter signal to each column conductor associated with a pixel in said select row that is to be in the scattering optical state.

6. A method according to claim 1, wherein one of said control signals has a first phase differing from that of all other of said control signals and a first polarity the same as that of all other of said plurality of said control signals.

7. A method according to claim 1, wherein said control signals are squarewaves.

8. A method according to claim 1, wherein said control signals provide the appropriate voltages to the liquid crystal to control its optical state.

9. A method according to claim 1, wherein said liquid crystal is a polymer stabilized liquid crystal.

10. A method according to claim 9, wherein said control signals provide appropriate voltages to the polymer stabilized liquid crystal to control its optical state.

11. A display device comprising:
   display means including an array of pixels arranged in a plurality of rows and a plurality of columns, said pixels have a first optical state and a second optical state, both optical states stable in the absence of an electric field; and
   control means for generating a plurality of control signals for application to the array of pixels to modify the optical state thereof, said control means simultaneously applying selective control signals to the plurality of rows having pixels requiting a change to the first optical state, and thereafter sequentially applying selective control signals to one or more rows of pixels having at least one pixel requiring a change in optical state.

12. A display device according to claim 11, wherein said first optical state is reflecting and said second optical state is scattering.

13. A display device according to claim 11, wherein said array of pixels includes a plurality of row conductors respectively associated with rows of pixels, and a plurality of column conductors respectively associated with columns of pixels, said plurality of row and column conductors selectively applying a voltage across each pixel.

14. A display device according to claim 11, wherein one of said plurality of control signals has a first phase differing from that of all other of said plurality of control signals and a first polarity the same as that of all other of said plurality of said control signals.

15. A display device according to claim 11, wherein said plurality of control signals are squarewaves.

16. A display device according to claim 11, wherein said plurality of control signals provide the appropriate voltages to the liquid crystal to control its optical state.

17. A display device according to claim 11, wherein said display means is a liquid crystal display.

18. A display device according to claim 17, wherein said liquid crystal display is a polymer stabilized liquid crystal.

19. A display device according to claim 11, wherein said control means generates the plurality of control signals in response to display data.

20. A display device according to claim 19, wherein said display device further comprises:
  processor means for generating the display data to display information on said display means; and
  memory means for storing the display data generated by the processor means.

21. A display device according to claim 19, wherein said control means includes display driver means.

22. A method for modifying a liquid crystal display comprised of an array of pixels arranged in a plurality of rows and a plurality of colas, said pixels have a first optical state and a second optical state, both optical states stable in the absence of an electric field, wherein control signals are applied to the array of pixels to modify the optical state thereof, said method comprising:
  determining a number of rows having pixels requiring a change in optical state; and
  determining whether the number of rows has reached a threshold value, wherein:
  (a) if the number of rows has not reached the threshold value, sequentially applying selective control signals to one or more rows of pixels having at least one pixel requiring a change in optical state, and
  (b) if the number of rows has reached the threshold value, simultaneously applying selective control signals to the plurality of rows having pixels requiring a change to the first optical state, and thereafter sequentially applying selective control signals to one or more rows of pixels having at least one pixel requiring a change in optical state.

23. A method according to claim 22, wherein said array of pixels includes a plurality of row conductors respectively associated with rows of pixels, and a plurality of column conductors respectively associated with columns of pixels, said plurality of row and column conductors selectively applying a voltage across each pixel.

24. A method according to claim 23, wherein step (a) of sequentially applying selective control signals includes the steps of:
  applying a select row signal to the row conductor associated with a row having at least one pixel requiring a change in optical state;
  applying a non-select row signal to the row conductors associated with the remaining rows;
  applying a reflect signal to each column conductor associated with a pixel in said row having at least one pixel requiring a change in optical state, wherein the change in optical state is to reflecting; and
  applying a scatter signal to each column conductor associated with the remaining pixels in said row having at least one pixel requiting a change in optical state.

25. A method according to claim 23, wherein step (b) of simultaneously applying selective control signals includes the steps of:
  applying a select row signal to every row conductor associated with a row having at least one pixel requiring a change from a scattering optical state to a reflecting optical state; and
  applying a reflect signal to each column conductor associated with a pixel that is to be in a reflecting optical state.

26. A method according to claim 23, wherein step (b) of sequentially applying selective control signals includes the steps of:
  applying a select row signal to the row conductor associated with a select row having at least one pixel requiring a change in optical state;
  applying a non-select row signal to the row conductors associated with the remaining rows;
  applying a reflect signal to each column conductor associated with a pixel in said select row that is to be in the reflecting optical state; and
  applying a select signal to each column conductor associated with a pixel in said select row that is to be in the scattering optical state.

27. A display device comprising:
  display means including an array of pixels arranged in a plurality of rows and a plurality of columns, said pixels have a first optical state and a second optical state, both optical states stable in the absence of an electric field;
  means for determining a number of rows having pixels requiring a change in optical state;
  means for determining whether the number of rows has reached a threshold value; and
  control means for generating a plurality of control signals for application to the array of pixels to modify the optical state thereof, wherein:
  (a) if the number of rows has not reached the threshold value, sequentially applying selective control signals to one or more rows of pixels having at least one pixel requiring a change in optical state, and
  (b) if the number of rows has reached the threshold value, simultaneously applying selective control signals to the plurality of rows having pixels requiting a change to the first optical state, and thereafter sequentially applying selective control signals to one or more rows of pixels having at least one pixel requiring a change in optical state.

28. A display device according to claim 27, wherein said first optical state is reflecting and said second optical state is scattering.

29. A display device according to claim 27, wherein said array of pixels includes a plurality of row conductors respectively associated with rows of pixels, and a plurality of column conductors respectively associated with columns of pixels, said plurality of row and column conductors selectively applying a voltage across each pixel.

30. A display device according to claim 27, wherein one of said plurality of control signals has a first phase differing from that of all other of said plurality of control signals and a first polarity the same as that of all other of said plurality of control signals.

31. A display device according to claim 27, wherein said plurality of control signals are squarewaves.

32. A display device according to claim 27, wherein said plurality of control signals provide the appropriate voltages to the liquid crystal to control its optical state.

33. A display device according to claim 27, wherein said display means is a liquid crystal display.

34. A display device according to claim 33, wherein said liquid crystal display includes a polymer stabilized liquid crystal.

35. A display device according to claim 27, wherein said control means generates the plurality of control signals in response to display data.

36. A display device according to claim 35, wherein said display device further comprises:

processor means for generating the display data to display information on said display means; and memory means for storing the display data generated by the processor means.

37. A display device according to claim 27, wherein said control means includes display driver means.

* * * * *